United States Patent
Betz

(10) Patent No.: US 7,798,017 B2
(45) Date of Patent: Sep. 21, 2010

(54) RAM PRESSURE PROBE HAVING TWO DUCTS AND A DIFFERENTIAL PRESSURE INCREASING ELEMENT

(75) Inventor: Oliver Betz, Gröbenzell (DE)

(73) Assignee: Systec Controls Mess-und Regelungstechnik GmbH, Puchheim (DE)

( * ) Notice: Subject to any disclaimer, the term of this patent is extended or adjusted under 35 U.S.C. 154(b) by 173 days.

(21) Appl. No.: 11/995,547

(22) PCT Filed: Jul. 14, 2005

(86) PCT No.: PCT/DE2005/001258

§ 371 (c)(1),
(2), (4) Date: Jun. 6, 2008

(87) PCT Pub. No.: WO2007/009409

PCT Pub. Date: Jan. 25, 2007

(65) Prior Publication Data

US 2009/0211372 A1    Aug. 27, 2009

(51) Int. Cl.
G01F 1/46    (2006.01)
G01F 1/34    (2006.01)
G01D 21/00   (2006.01)

(52) U.S. Cl. ............... 73/861.65; 73/866.5; 73/861.42; 128/205.27

(58) Field of Classification Search ............. None
See application file for complete search history.

(56) References Cited

U.S. PATENT DOCUMENTS

| | | | | | |
|---|---|---|---|---|---|
| 3,590,637 | A | * | 7/1971 | Brown | ............... 73/172 |
| 3,683,693 | A | * | 8/1972 | Brown | ............ 73/861.65 |
| 3,910,113 | A | * | 10/1975 | Brown | ............ 73/861.65 |
| 5,535,633 | A | * | 7/1996 | Kofoed et al. | ........ 73/861.52 |
| 6,321,166 | B1 | * | 11/2001 | Evans et al. | ............ 702/50 |
| 6,634,242 | B2 | * | 10/2003 | Cha et al. | ........... 73/861.66 |

* cited by examiner

Primary Examiner—Harshad Patel
(74) Attorney, Agent, or Firm—Laurence A. Greenberg; Werner H. Stemer; Ralph E. Locher

(57) ABSTRACT

Ram pressure probe having two ducts which are separated from one another and lead with one of their ends to a pressure measuring sensor, with a fluidic differential pressure increasing element and an opening at the respective other end of each duct, the openings being arranged at various locations between which there is a higher value for the differential pressure, generated by the effect of the differential pressure increasing element, than the value of the dynamic pressure of the flowing fluid, and all the openings (9a, 9b) are arranged in such a way that the vertical axis passes through the opening surface at an angle to the direction (S) of flow which prevails during the measuring process.

8 Claims, 2 Drawing Sheets

RAM PRESSURE PROBE HAVING TWO DUCTS AND A DIFFERENTIAL PRESSURE INCREASING ELEMENT

BACKGROUND OF THE INVENTION

Field of The Invention

The invention relates to a ram pressure probe.

A ram pressure probe of this type is known, for example, from EP 0 198 197 A2.

The known ram pressure probe has the disadvantage that the openings which are connected via a duct to the actual pressure sensor partially point counter to the direction of flow and therefore foreign substances, which are also transported by the flow, can enter these openings, thus falsifying the measurement value.

Due to the arrangement of the openings in the lateral region of the duct which passes on the pressure to the actual pressure sensor, it is extremely unlikely that the foreign substances will leave the duct again by themselves. In fact, it is very likely that the foreign substances will continually remain in the duct and permanently falsify the measurement result.

BRIEF SUMMARY OF THE INVENTION

It is an object of the present invention to provide a ram pressure probe in which the likelihood of foreign substances entering the openings is reduced in principle by means of constructive measures.

It is another object to provide a ram pressure probe in which, likewise by means of constructive measures, it is made possible for foreign substances which still enter the ram pressure probe to leave again in a simple manner.

It is the superordinate object to ensure the measurement accuracy of the ram pressure probe over a relatively long period of time, even if there are foreign substances in the measured fluid.

The object is achieved by the present invention.

The arrangement of the openings at an angle to the direction of flow which prevails during the measuring process prevents entrained foreign substances from being brought inside the ducts.

The subclaims relate to developments and/or specific refinements of the invention.

The considerations which led to the development of the present invention are based on the fact that the pressure acts in all directions and, for detecting the ram pressure, the opening which passes on the ram pressure to the actual pressure sensor via a duct does not need to point in the direction of the flow. It therefore suffices if said opening is arranged in the vicinity of an impact surface.

DESCRIPTION OF THE INVENTION

The invention will be explained in more detail below with reference to drawings.

Figure 1:
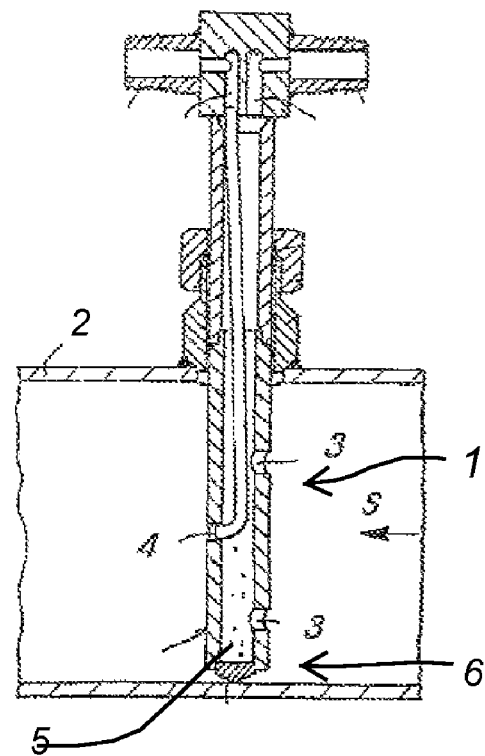
FIG. 1 shows, in cross section, a ram pressure meter 1 according to the prior art, which extends into a tube 2

FIG. 1 shows, in cross section, a ram pressure meter 1 according to the prior art, which extends into a tube 2. A medium moves in said tube 2 in the direction S. The ram pressure sensor 1 has openings 3 counter to the direction of flow and an opening 4 in the direction of flow.

In a known manner, there is a pressure differential between the openings 3 on the one hand and the opening 4 on the other hand, which pressure differential depends on the flow rate of the medium. Foreign substances 5 entrained in the medium can enter the openings 3 and then fall to the bottom 6 inside the ram pressure sensor and accumulate there or stochastically swirl around inside the ram pressure sensor.

This can lead to an undesired change in the measurement characteristic of the ram pressure sensor.

Figure 2:
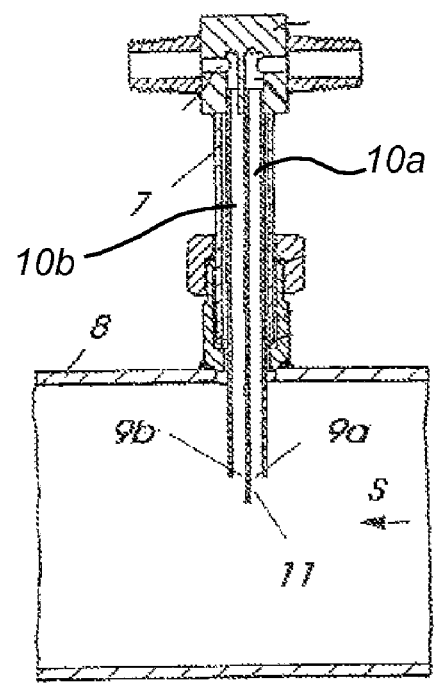
FIG. 2 shows, in cross section, a ram pressure meter 7 according to the invention, which extends into a tube 8

FIG. 2 shows, in cross section, a ram pressure meter 7 according to the invention, which extends into a tube 8. A medium likewise moves in said tube 8 in the direction S.

The flow meter has two openings 9a and 9b which point downward in the example shown. The openings 9a and 9b are separated by an areal region. This areal region has the function of a differential pressure increasing element 11 and can have various shapes in order to fulfill this function. In the example shown, said differential pressure increasing element 11 is designed as a flat surface.

Said medium S impacts against the differential pressure increasing element 11. In the vicinity of the surface against which the medium impacts, a pressure increase occurs on account of a ram pressure. As the medium flows around the differential pressure increasing element 11, its speed increases in a known manner and, accordingly, a negative pressure prevails on that side of the differential pressure increasing element 11 which faces away from the flow.

The openings 9a and 9b are arranged such that the opening 9a is located in the region of the pressure increase and the opening 9b is located in the region of the decreased pressure and that a pressure differential between the two openings 9a, 9b occurs on account of the flowing medium and its impact against the differential pressure increasing element 11. This pressure differential depends on the flow rate.

The openings 9a and 9b each form the end of a separate duct 10a and 10b, at the other end of which the sensors are located which are used for measuring the pressure differential. These sensors are located outside the tube 8 and are not illustrated here.

Figure 3:
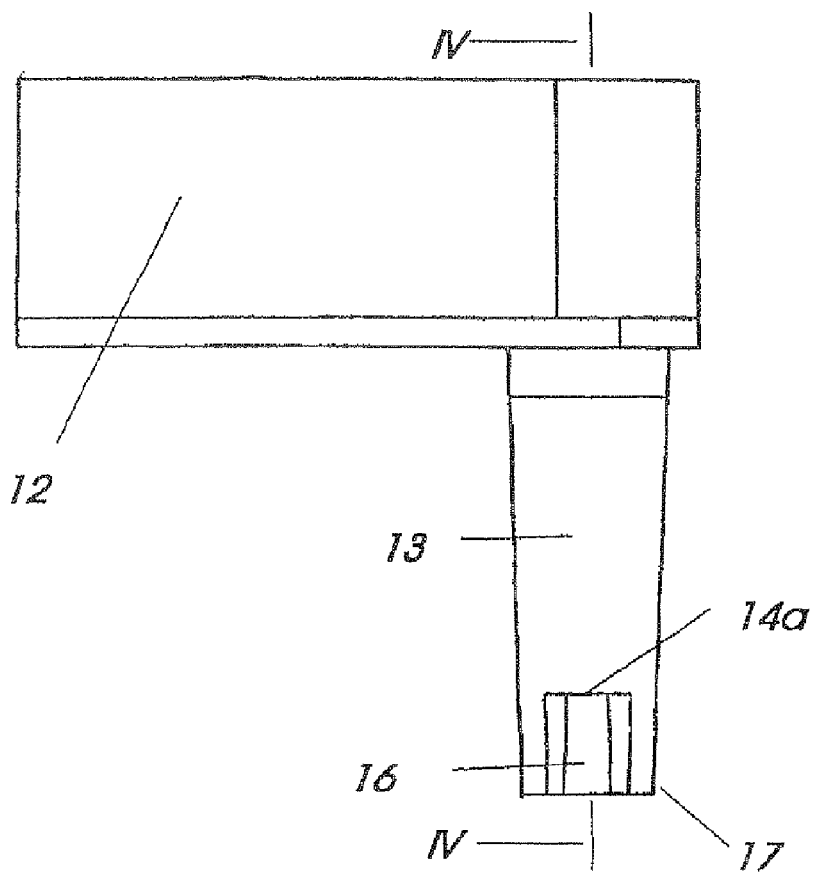
FIG. 3 shows a possible exemplary embodiment of a ram pressure sensor, as viewed from the direction from which the flowing medium will impact.

FIG. 3 shows a possible exemplary embodiment of a ram pressure sensor, as viewed from the direction from which the flowing medium will impact.

The ram pressure sensor has a housing 12 in which the pressure sensors are located. When the pressure sensor is in use, this housing is located outside the flowing medium. That part of the pressure sensor which comes into contact with the medium, the probe 13, leads downward out of this housing.

Located at the lower end of the probe 13 are openings which point downward. Only one opening 14a can be seen in this view. The probe 13 has, at its proximal end, an areal region which acts, as already explained with reference to FIG. 2, as differential pressure increasing element 16.

Figure 4:
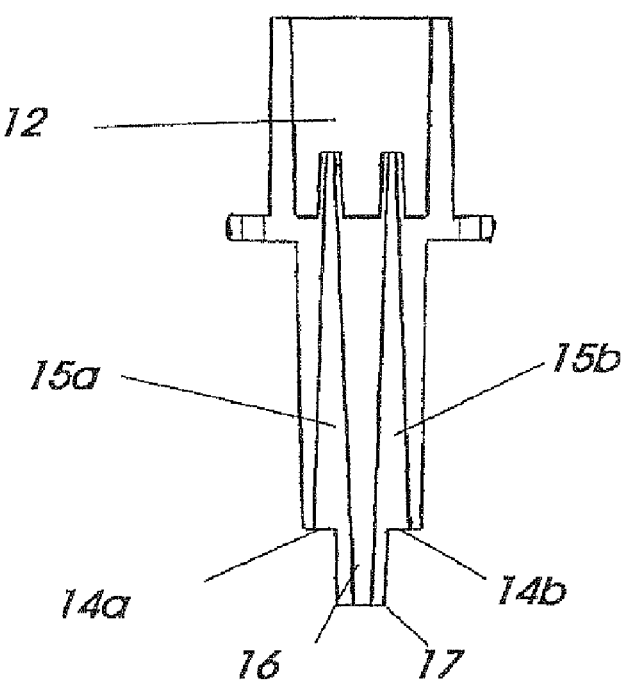
FIG. 4 shows a section along line IV.

FIG. 4 shows a section along line IV. In this illustration, the ducts 15a and 15b, which lead to the actual pressure sensors (not shown here) in the housing 12, can also now be seen. A differential pressure increasing element 16 is arranged between the ducts. This differential pressure increasing element 16 protrudes from between the ducts 15a and 15b. The flow S impacts against the differential pressure increasing element 16 and produces a ram pressure which reaches a pressure sensor via the opening 14a and the duct 15a.

The differential pressure increasing element 16 has a separation edge 17. On that side of the differential pressure increasing element 16 which faces away from the flow negative pressure occurs. The value of this negative pressure can be detected by another pressure sensor. This pressure sensor is located at the other end of the duct 15b.

The ram pressure meter is preferably installed in such a position that the ram pressure probe 13 points downward substantially perpendicularly. The installed position causes the impacting medium to produce a ram pressure, without being pushed directly into the duct 15a via the opening 14a.

To the extent that foreign substances entrained in the flow impact against the probe 13, they first come into contact with the differential pressure increasing element 16 and then rebound from the latter.

The installed position, which points downward substantially perpendicularly also causes these rebounding foreign substances to drop downward on account of gravity and prevents them, likewise on account of gravity, from entering the opening 14a.

If, however, a foreign substance still enters the duct 15 via the opening 14 due to eddies occurring, the conically tapered profile of the duct 14, which continually narrows in the direction of the pressure sensor, causes the foreign substances to always encounter a wall of the duct; said wall extends, as it were, "head first" and thus offers little grip for deposits to deposit on the wall.

The diameter of the ducts 15 is dimensioned such that no capillary attraction can occur in the case of liquid foreign substances.

The invention claimed is:

1. A ram pressure probe, comprising:
   two ducts which are separate from one another and one end of which leads to a pressure measurement sensor;
   a flow-mechanical differential pressure increasing element;
   an opening at the respective other end of each duct, the openings being arranged at different locations between which a higher value for the differential pressure occurs, due to the effect of the differential pressure increasing element, than the value of the dynamic pressure of the flowing fluid, the ducts having a conically extending cross section and the cross section being larger in the region of the openings than at that end of the duct which leads to the pressure measurement sensor;
   all openings being disposed such that the perpendicular axis extends through the opening surface at an angle with respect to the direction of flow which prevails during the measuring process.

2. The ram pressure probe as claimed in claim 1, wherein a differential pressure increasing element is provided, against which the foreign substances entrained in the flow impact and from which they rebound.

3. The ram pressure probe as claimed in claim 1, wherein the openings are aligned such that foreign substances deposited in the ducts can leave the ducts in a manner such that they follow the force of gravity.

4. The ram pressure probe as claimed in claim 1, wherein the differential pressure increasing element has a separation edge.

5. The ram pressure probe as claimed in claim 1, wherein the differential pressure increasing element is arranged between the axes of the ducts such that it protrudes beyond the openings of the ducts.

6. The ram pressure probe as claimed in claim 1, wherein the differential pressure increasing element has a path extension for the flowing fluid.

7. A ram pressure meter comprising a ram pressure probe as claimed in claim 1, wherein the ram pressure probe is inserted into a closed duct such that the perpendicular axis through the opening surface extends at an angle with respect to the direction of flow which prevails during the measuring process.

8. A ram pressure meter comprising a ram pressure probe as claimed in claim 1, wherein the ram pressure probe can be inserted into an open duct such that the probe is located in the flowing medium and the perpendicular axis through the opening surface of the openings extends at an angle with respect to the direction of flow which prevails during the measuring process.

* * * * *